(12) United States Patent
Hipp et al.

(10) Patent No.: US 10,011,534 B2
(45) Date of Patent: Jul. 3, 2018

(54) PROCESS FOR FORMING CARBON COMPOSITE MATERIALS

(71) Applicant: GOODRICH CORPORATION, Charlotte, NC (US)

(72) Inventors: Brian Hipp, Spokane, WA (US); Paul Perea, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 342 days.

(21) Appl. No.: 14/712,584

(22) Filed: May 14, 2015

(65) Prior Publication Data

US 2016/0332917 A1    Nov. 17, 2016

(51) Int. Cl.
| | |
|---|---|
| *C04B 35/00* | (2006.01) |
| *C04B 35/524* | (2006.01) |
| *B29B 11/16* | (2006.01) |
| *C04B 35/83* | (2006.01) |
| *B29K 233/20* | (2006.01) |
| *B29K 307/04* | (2006.01) |

(52) U.S. Cl.
CPC ............ *C04B 35/524* (2013.01); *B29B 11/16* (2013.01); *C04B 35/83* (2013.01); *B29K 2233/20* (2013.01); *B29K 2307/04* (2013.01); *C04B 2235/48* (2013.01)

(58) Field of Classification Search
CPC .................................................... C04B 35/524
See application file for complete search history.

(56) References Cited

U.S. PATENT DOCUMENTS

| | | | |
|---|---|---|---|
| 3,675,061 A | 7/1972 | Harrison | |
| 3,867,491 A | 2/1975 | Marin | |
| 5,264,162 A | 11/1993 | Salem et al. | |
| 5,433,937 A | 7/1995 | Sohda et al. | |
| 5,503,893 A | 4/1996 | Evans et al. | |
| 5,599,603 A | 2/1997 | Evans et al. | |
| 5,705,008 A * | 1/1998 | Hecht ................. | C04B 35/80 |
| | | | 156/148 |
| 6,183,583 B1 | 2/2001 | Duval et al. | |
| 6,237,203 B1 | 5/2001 | Sheehan et al. | |
| 6,767,602 B1 | 7/2004 | Duval et al. | |
| 8,060,997 B2 | 11/2011 | Wall, III et al. | |
| 2006/0073338 A1 | 4/2006 | Simpson et al. | |
| 2006/0177663 A1 | 8/2006 | Simpson et al. | |

(Continued)

FOREIGN PATENT DOCUMENTS

| | | |
|---|---|---|
| EP | 3085823 | 10/2016 |
| WO | 9101397 | 2/1991 |

OTHER PUBLICATIONS

Extended European Search Report dated Oct. 14, 2016 in European Application No. 16169899.8.

(Continued)

*Primary Examiner* — Robert A Vetere
(74) *Attorney, Agent, or Firm* — Snell & Wilmer L.L.P.

(57) ABSTRACT

Processes for making carbon/carbon parts are provided. The process involves compression, carbonization and densification steps. Pressure may be applied to a fibrous preform prior to the carbonization step at a temperature less than an exothermic temperature to increase the fiber volume ratio of the fibrous preform. The densification steps may include filling the voids of the fibrous preform with a carbon matrix.

14 Claims, 4 Drawing Sheets

(56) References Cited

U.S. PATENT DOCUMENTS

2007/0186396 A1* 8/2007 Linck .................... C04B 35/645
                                                                28/112
2013/0248305 A1* 9/2013 Choi ....................... F16D 65/12
                                                                188/218 XL

OTHER PUBLICATIONS

Communication pursuant to Article 94(3) EPC dated Oct. 27, 2017 in European Application No. 16169899.8.
Hay, J. N., "Thermal Reactions of Polyacrylonitrile" Journal of Polymer Science: Part A-1, 1968, pp. 2127-2135, vol. 6.

* cited by examiner

PROCESS FOR FORMING CARBON COMPOSITE MATERIALS

FIELD

The present disclosure relates generally to the manufacture of composite materials and parts. More particularly, the disclosure relates to a method and system for forming preforms that are compressed prior to carbonization.

BACKGROUND

Carbon/carbon ("C/C") parts are employed in various industries. An exemplary use for C/C parts includes use as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat and thus is able to dissipate heat away from the braking surfaces that is generated in response to braking. C/C material is also highly resistant to heat damage, and is thus capable of sustaining friction between brake surfaces during severe braking, without a significant reduction in the friction coefficient or mechanical failure.

SUMMARY

According to various embodiments, a method for forming a carbon composite preform may include loading a fibrous preform comprising oxidized polyacrylonitrile (OPF) fibers extending in multiple directions and having pores extending therethrough into a stack having a first plate, a second plate and a spacer, applying compression at an elevated temperature to the fibrous preform prior to a carbonization step to compress a thickness of the fibrous preform, and carbonizing the fibrous preform by heating the fibrous preform in a furnace to convert fibers of the fibrous preform into carbon fibers. The method may further comprise a step of densifying the fibrous preform by depositing a carbon matrix within a plurality of pores of the fibrous preform after carbonizing the fibrous preform. During the step of applying mechanical pressure to the fibrous preform, the fibrous preform may be heated to a temperature less than an exothermic temperature of the fibrous preform. The exothermic temperature may be 180° C. Mechanical pressure may be applied along a direction of a plurality of z-fibers of the fibrous preform. During carbonization, the furnace may be heated to at least 1600° C. The mechanical pressure may be applied between about 60 and 180 minutes. Further, the mechanical pressure may be a compressive force of between about 5 psi and about 150 psi on the fibrous preform.

According to various embodiments, another method for forming a carbon composite preform may include applying compression at a temperature below 180° C. to the fibrous preform prior to a carbonization step to compress a thickness of the fibrous preform, and carbonizing the fibrous preform by heating the fibrous preform in a furnace to convert the fibers into substantially carbon fibers. The method may further comprise densifying the fibrous preform by depositing a carbon matrix within a plurality of pores of the fibrous preform. The fibrous preform may comprise a plurality of oxidized polyacrylonitrile (OPF) fibers. The mechanical pressure may be applied for a time period between about 60 and 180 minutes. Further, the mechanical pressure may be applied along a direction of a plurality of z-fibers of the fibrous preform. During carbonization, the furnace may be heated to at least 1600° C.

According to various embodiments, another method for forming a carbon composite preform may include loading a fibrous preform comprising oxidized polyacrylonitrile (OPF) fibers extending in multiple directions and having pores extending therethrough into a stack having a first plate, a second plate and a spacer, applying mechanical pressure at an elevated temperature less than 180° C. to the fibrous preform prior to a carbonization step to compress a thickness of the fibrous preform, and after the applying, carbonizing the fibrous preform in the carbonization step by heating the fibrous preform in a furnace to at least 1600° C. to convert the fibers of the fibrous preform into carbon fibers for between 60 and 180 minutes. The applying may be between about 5 lbs/in$^2$ (psi) and about 150 psi. Further, the applying may be by a dead weight. During the loading, the fibrous preform may have a fiber volume ratio between about 40% and about 45%. After the carbonizing, the fibrous preform may have a fiber volume ratio of about 20% to about 23%.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
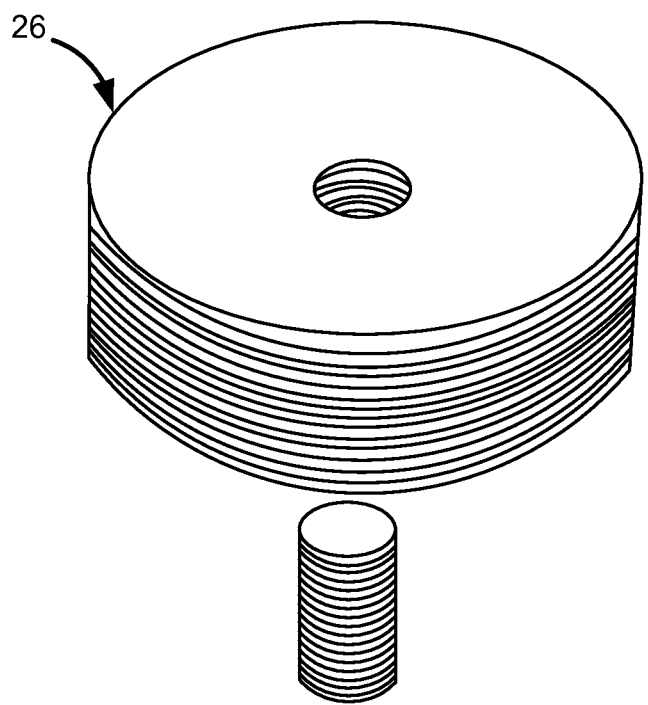
FIG. 1 illustrates a perspective view of a fibrous preform in accordance with various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

In general, there are currently two primary methods of manufacturing C/C materials. The first method involves the layup and cure of a carbon fiber, phenolic resin matrix composite, followed by pyrolysis and subsequent phenolic resin infiltration and pyrolysis cycles. Multiple resin infiltration and pyrolysis cycles are typically used until the part achieves the desired density. The second method involves fabrication of an oxidized PAN (OPF) or carbon fiber preform, followed by carbonization and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions.

After a fibrous preform is made, it is carbonized to convert the OPF into carbon fibers. Typically, fibrous preforms are carbonized by placing the preforms in a furnace with an inert atmosphere. As is well-understood, the heat of the furnace causes a chemical conversion which drives off the non-carbon chemical species from the preform. The resulting preform generally has the same fibrous structure as the fibrous preform before carbonizing. However, the OPF have been converted to 100% or nearly carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

Referring now to the drawings, and particularly to FIG. 1, a fibrous preform 26 in accordance with various embodiments is illustrated. Fibrous preform 26 may, for example, comprise PAN or OPF fibers extending in three directions and leaving a plurality of pores or open spaces and may be prepared for compression and carbonization. In various embodiments, fibrous preform 26 is formed by stacking layers of PAN or OPF fibers and superimposing the layers. The layers may be needled perpendicularly to each other with barbed, textile needles. The needing process generates a series of z-fibers through fibrous preform 26 that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack of layers is formed. The needles may also penetrate through only a portion of fibrous preform 26, or may penetrate through the entire fibrous preform 26. In addition, resins are sometimes added to fibrous preform 26 by either injecting the resin into the preform following construction or coating the fibers or layers prior to forming the fibrous preform 26.

Figure 2:
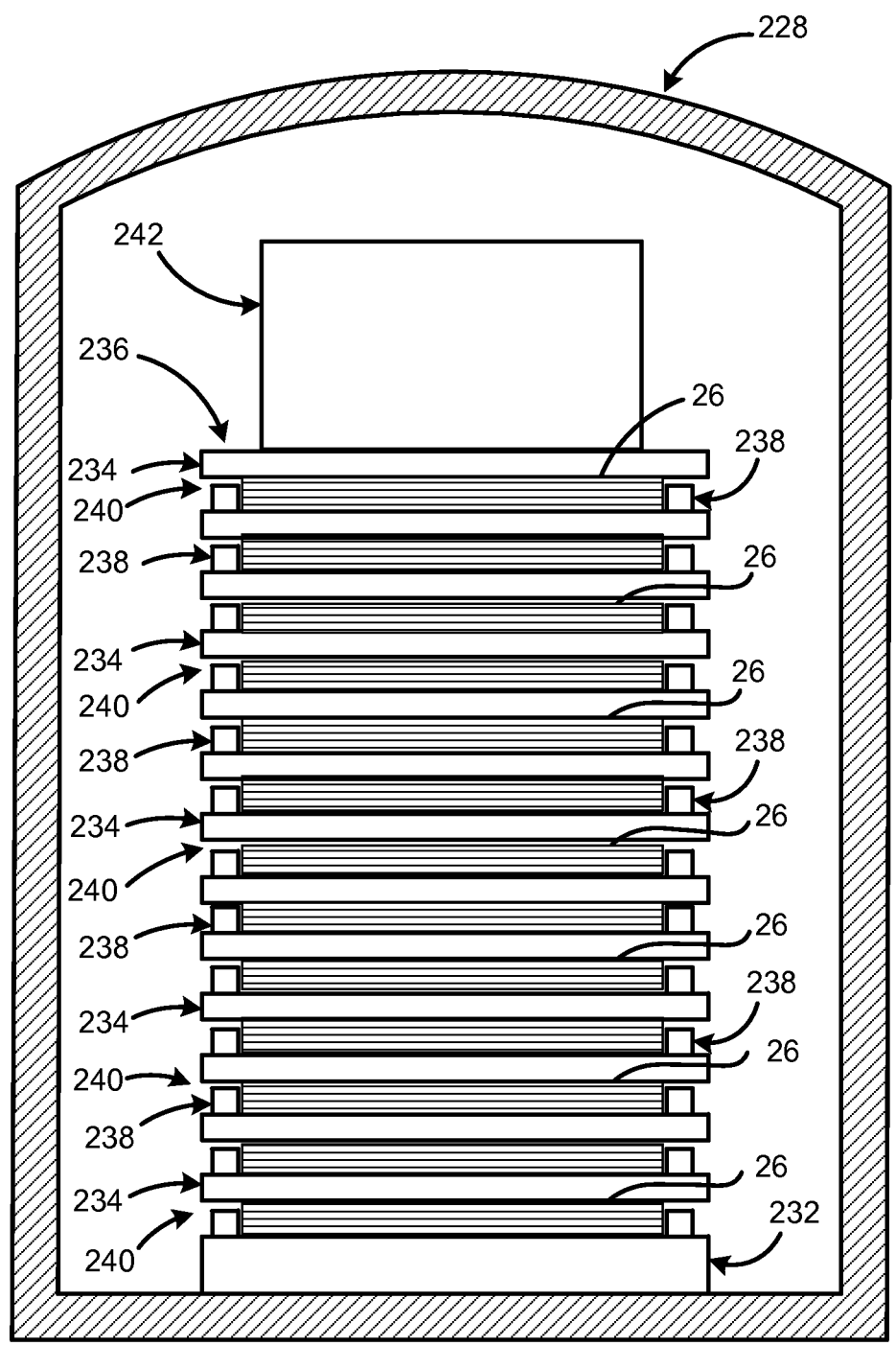
FIG. 2 illustrates a side view of a stack of fibrous preforms vertically in an oven and arranged for applying heat and pressure to the fibrous preforms prior to a carbonization process in a carbonization furnace, in accordance with various embodiments.
Figure 3:
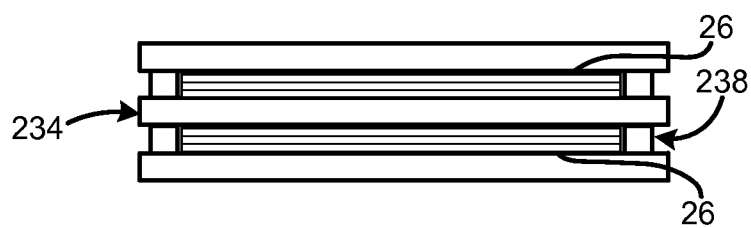
FIG. 3 illustrates a partial side cutaway view of a stack of fibrous preforms during the application of heat and pressure to an annular fibrous preform prior to a carbonization process in a carbonization furnace, in accordance with various embodiments.
Figure 4:
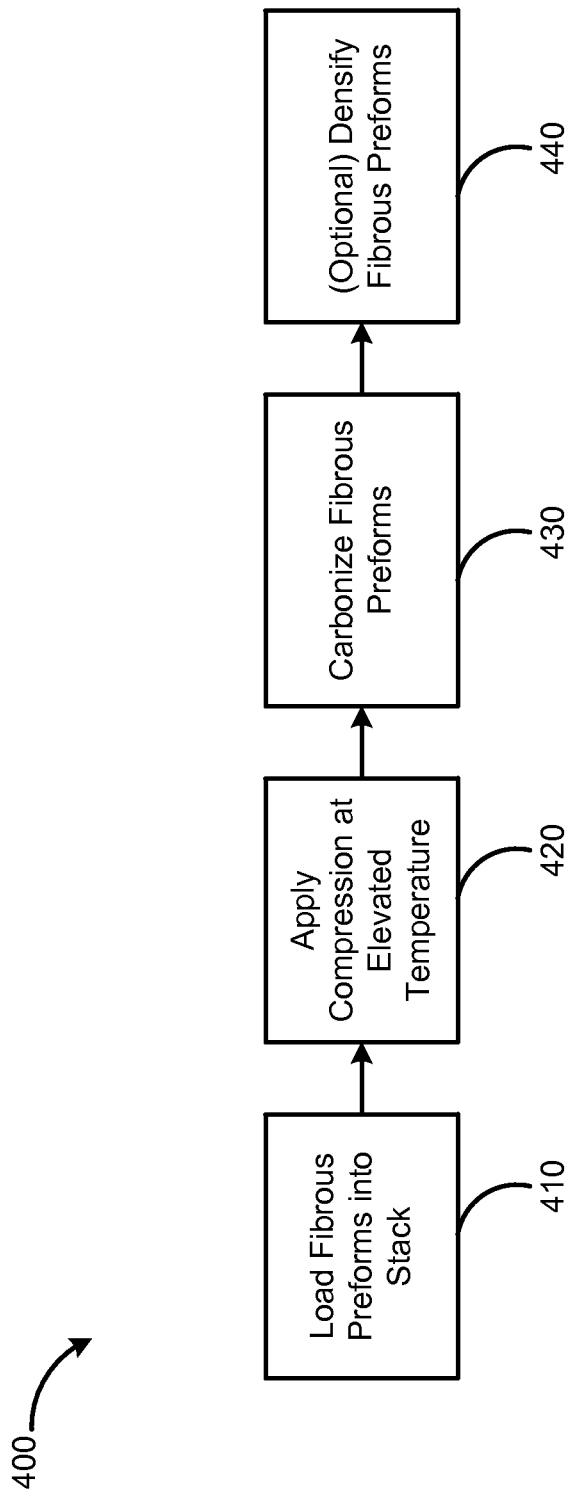
FIG. 4 illustrates a flow chart for a process of forming a fibrous preform, in accordance with various embodiments.

With reference to FIG. 4, a method 400 for forming carbon/carbon parts in accordance with various embodiments is illustrated. Method 400 may comprise, for example, a step 410 of loading a plurality of fibrous preforms into a vertical stack 236 (see FIG. 2). In various embodiments, as illustrated in FIGS. 2 and 3, stack 236 may be formed by placing fibrous preforms 26 on top of each other with separator plates 234 and spacing stops 238 (also referred to herein as "spacers") between each fibrous preform 26 to form stack 236. Typically, stops 238 are designed at a height (in the Z direction) that is less than the thickness of the fibrous preform 26 and defined by a target thickness of the fibrous preform 26. For example, the bottommost fibrous preform 26 may be placed on a base plate 232 at the bottom of a housing and/or oven 228. A separator plate 234 may be placed on top of the bottommost fibrous preform 26. Another fibrous preform 26 may then be placed on the separator plate 234, and another separator plate 234 may be placed on that fibrous preform 26. The preform stack 236 of fibrous preforms 26 and separator plates 234 may be constructed in this manner, with each fibrous preform 26 being separated from superjacent and subjacent fibrous preforms 26 by separator plates 234. Stops 238 which are shorter than the thickness of each corresponding OPF fibrous preform 26 may be placed between each of the separator plates 234. Thus, after the preform stack 236 of fibrous preforms 26 is constructed, gaps 240 exist between the stops 238 and adjacent separator plates 234.

Also, multiple fibrous preforms 26 may be placed between each separator plate 234 with a stop 238 to control the total thickness following carbonization. Thus, at least two fibrous preforms 26 may be placed between two separator plates 234 with a stop 238 positioned between the two separator plates 234. As a result, the compression is combined for multiple fibrous preforms 26.

Although FIG. 2 illustrates a single preform stack 236 of fibrous preforms 26 in oven 228, multiple preform stacks of fibrous preforms 26 could also be placed oven 228. Moreover, preform stack 236 of fibrous preforms 26 may be constructed in the oven 228 or may be constructed outside of the oven 228 and moved into oven 228 after construction with lifting equipment.

In various embodiments, method 400 (see FIG. 4) further comprises a step 420 of applying compression at an elevated temperature. For example, compression may be applied to stacks 236 of fibrous preforms 26 at a temperature less than an exothermic temperature. In various embodiments, the exothermic temperature is about 180° C. (or about 356° F.), and oven 228 is heated to a temperature lower than 180° C. (or about 356° F.) as compression is applied to stack 236. For example, oven 228 may be heated to a temperature not to exceed 180° C. (or about 356° F.) as compression is applied to stack 236. In various embodiments, the exothermic temperature may depend on the physical characteristics of the material of the fibers of fibrous preform 26.

In various embodiments, as illustrated in FIG. 2, compression may be applied by placing a dead weight 242 on top of the preform stack 236 of fibrous preforms 26 after the preform stack 236 is constructed. Preferably, the weight of the dead weight 242 is at least 150 pounds and generates a compressive force of about 200 psi (about $1.379 \times 10^6$ newtons/square meter), but more or less weight may be used depending on the size of the fibrous preform 26 being compressed and the z-fiber content and resultant compressibility of the fibrous preform 26.

For instance, a compressive force of between 5 psi and 200 psi ($3.447 \times 10^4$ newtons/square meter and $1.379 \times 10^6$ newtons/square meter) may be applied on fibrous preform 26 having a fiber volume ratio between about 32% and 35% fiber volume (where the fiber volume ratio is the total volume of the fibers compared to the total volume of the fibrous preform) after needling. According to various embodiments, the compressive force applied may be between 5 psi and 150 psi ($3.447 \times 10^4$ newtons/square meter and $1.034 \times 10^6$ newtons/square meter) on a fibrous preform 26 with a fiber volume ratio between about 20 and 24% fiber volume after carbonization. According to various embodiments, a low or moderate needling density, with a fiber volume ratio between about 35% and 50% after needling may be utilized. For example, in a fibrous preform that is needled with a moderate needling density, the OPF fiber volume ratio is between 40% and 50%. A low needling density may also be desirable in certain embodiments, such as a fiber volume ratio between 35% and 45% or an OPF fiber volume ratio between about 32% and 35% fiber volume after needling.

Further, compressive pressure may be left on stacks 236 of fibrous preforms 26 for a predetermined period of time. For instance, the predetermined period of time may be less than about 180 minutes, or further, less than 3 hours, where the term about in this context only means+/−5 minutes. In various embodiments, the period of time may be between about 60 minutes and 180 minutes. The compressive pressure may be measured as a pressure in psi (lb./in$^2$) applied to one fibrous preform 26 in the preform stack 236. For example, a pressure between about 5 psi ($3.447 \times 10^4$ newtons/square meter) and 200 psi ($1.379 \times 10^6$ newtons/square meter) may be applied to the top fibrous preform 26 in the preform stack 236. This pressure may be applied with a dead weight 242 or in other ways. If a dead weight 242 is applied as shown, it is understood that the compressive pressure may be somewhat less on the top fibrous preform 26 than on the bottom fibrous preform 26 in the preform stack 236 due to the added weight of the fibrous preforms 26 and stacking hardware.

In various embodiments, method 400 (see FIG. 4) further comprises a step 430 of carbonizing the fibrous preforms 26. For example, fibrous preforms 26 may be transported to a furnace for carbonization. The carbonization process converts the OPF in the fibrous preforms 26 into substantially 100% carbon fibers. The carbonization process is distinguished from the densification process described below in that the densification process involves infiltrating the pores of the fibrous preform with a gas under a vacuum or near vacuum ambient pressure and depositing a carbon matrix within the fibrous preform. In contrast, carbonization refers only to the process of converting the fibers which are used to form the fibrous preforms 26 into carbon fibers. Although it is possible to use pure carbon fibers in the needling process, it is generally undesirable to use pure carbon fibers when forming fibrous structures using typical textile machines because of the difficulties of working with pure carbon fiber. By contrast, carbonaceous fibers like PAN and OPF, which contain carbon in addition to other compounds, have been found to be much easier to work with during typical textile techniques used to form fibrous preforms. For example, PAN and OPF are more stretchable and resilient compared to carbon fiber, and thus, are easier to use in textile machinery. PAN and OPF are also less electrically conductive than carbon fibers, which makes PAN and OPF safer to work with and less harmful to electronic components in the preform manufacturing equipment. As a result, the carbonization process allows the fibrous preform 26 to be formed with fibers that are not pure carbon. The fibers that are used during the forming process are then converted during the carbonization process so that the final fibrous preform prior to densification is made up of substantially pure carbon fibers.

In various embodiments, step 430 comprises heating the fibrous preforms 26 to a temperature of at least 1600° C. (about 2,910° F.). Typically, an inert atmosphere of nitrogen is provided in the furnace during the carbonization process. The heat of the furnace causes a chemical conversion of the OPF which converts the fibers to carbon fibers and drives off other chemical species. Although it is preferred that the fibers in the carbonized fibrous preforms 26 be 100% carbon fiber, it is generally acceptable for a slightly less than full conversion to take place, and the resulting carbon fiber may be as low as 99.5% carbon.

During carbonization, the total mass and the total fiber volume in each fibrous preform 26 is typically reduced due to the loss of non-carbon compounds. For example, a typical fibrous preform 26 may lose approximately 50% of its weight during carbonization. In addition, the overall volume of the fibrous preform 26 typically shrinks approximately 25-30% volumetric shrinkage during carbonization. When these factors are combined, a typical OPF fibrous preform 26 which has a fiber volume ratio of between about 35% to 55% after the forming processes may have a fiber volume ratio of about 16% to 28% after the carbonization process.

In this example, no additional compressive pressure is applied to the fibrous preform during the carbonization processes, other than nominal pressures related to typical textile techniques, regular handling pressures, and the weight of stacked fibrous preforms and the weight of stacking hardware.

Therefore, a typical fibrous preform with a fiber volume ratio between about 40% and 50% after the forming process may have a fiber volume ratio of about 25% to 27% after compression and carbonization. Similarly, a typical fibrous preform with a fiber volume ratio between about 40% and 45% after the forming process may have a fiber volume ratio of about 20% to 23% after carbonization. However, the content of fibers in the z-direction generally remains unchanged during carbonization. According to various embodiments, the in-plane carbon fiber content may increase from pre-carbonization compression techniques described herein leaving the z-fiber contact intact.

At the preform stage and after carbonization, the fibrous preforms 26 preferably have a structure of carbon fibers extending in three directions through the fibrous preform 26 and pores extending therethrough. In various embodiments, the fiber volume ratio after carbonization may be about 20-28%. The fiber volume ratio may also be increased by applying compressive pressure during carbonization so that the fiber volume ratio is greater than 22% after carbonization.

In response to the fibrous preforms 26 being carbonized, the fibrous preforms 26 may be removed from the carbonization furnace. The dead weight 242 may be removed from the preform stack 236 of fibrous preforms 26 and the fibrous preforms 26 maintain their higher fiber volume ratio without the need for further application of compressive pressure. The fibrous preforms 26 may be disassembled from the preform stack 236, if desired, to allow for inspection and/or other processing steps.

In various embodiments, method 400 may comprise an optional step 440 of densifying the fibrous preforms 26. For example, the fibrous preforms 26 may be placed in stacks in a densifying furnace. As well known to those in the art, the densification process deposits a carbon matrix within the pores of a fibrous preform. Many different types of densification processes may be used to densify fibrous preforms. For example, a hydrocarbon gas or mixture of gases may be provided to a densifying furnace, such as natural gas or propane. Typically, a furnace temperature of about 1000° C. (about 1,832 degree Fahrenheit) is preferred for the densification process.

One advantage of carbon/carbon parts made by the described process is that they are especially suited for use as brake disks for large passenger jet aircrafts. When used in such applications, the described process may be used to manufacture brake disks with a higher friction coefficient then conventional carbon/carbon brake disks. For example, carbon/carbon brake disks made by the improved process described herein, the friction coefficient at RTO (i.e., "rejected take-off") may be increased as compared with conventionally processed brake disks. In addition, carbon/carbon brake disks made by the improved process may be more durable and may wear at a lower rate as compared with conventional brake disks. The demonstrated improvements are significant in that they provide opportunity for improvements in brake design characteristics, including possible weight savings, and more importantly, improvements in financial returns as a result of longer wear life. The described process is also advantageous because it is readily adaptable to present manufacturing processes without the need for significant changes to the manufacturing process or the equipment used in the process.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for forming a carbon composite preform comprising:
    loading a fibrous preform comprising oxidized polyacrylonitrile (OPF) fibers extending in multiple directions and having pores extending therethrough into a stack having a first plate, a second plate and a spacer;
    applying compression at an elevated temperature less than an exothermic temperature to the fibrous preform prior to a carbonization step to compress a thickness of the fibrous preform;
    decompressing the fibrous preform; and
    after the decompressing, carbonizing the fibrous preform in the carbonization step by heating the fibrous preform in a furnace to convert the fibers of the fibrous preform into carbon fibers.

2. The method of claim 1, further comprising a step of densifying the fibrous preform by depositing a carbon matrix within the pores of the fibrous preform after carbonizing the fibrous preform.

3. The method of claim 1, wherein the exothermic temperature is 180° C.

4. The method of claim 1, wherein the elevated temperature is less than or equal to 180° C.

5. The method of claim 1, wherein the applying is along a direction of a plurality of z-fibers of the fibrous preform.

6. The method of claim 1, wherein the carbonizing comprises heating the furnace to at least 1600° C.

7. The method of claim 1, wherein the applying is between about 60 and 180 minutes.

8. The method of claim 1, wherein the applying is between about 5 lbs/in2 (psi) and about 150 psi.

9. The method of claim 1, wherein the applying is by a dead weight; and
    wherein the decompressing comprises removing the dead weight from the fibrous preform.

10. A method for forming a carbon composite preform comprising:
    loading a fibrous preform comprising oxidized polyacrylonitrile (OPF) fibers extending in multiple directions and having pores extending therethrough into a stack having a first plate, a second plate and a spacer;
    applying mechanical pressure at an elevated temperature less than 180° C. to the fibrous preform prior to a carbonization step to compress a thickness of the fibrous preform;
    removing the mechanical pressure from the fibrous preform; and
    after the removing, carbonizing the fibrous preform in the carbonization step by heating the fibrous preform in a furnace to at least 1600° C. to convert the fibers of the fibrous preform into carbon fibers for between 60 and 180 minutes.

11. The method of claim 10, wherein the applying is between about 5 lbs/in2 (psi) and about 150 psi.

12. The method of claim 10, wherein the applying is by a dead weight; and
    wherein the removing the mechanical pressure comprises removing the dead weight from the fibrous preform.

13. The method of claim 10, wherein during the loading, the fibrous preform has a fiber volume ratio between about 40% and about 45%.

14. The method of claim 10, wherein after the carbonizing, the fibrous preform has a fiber volume ratio of about 20% to about 23%.

\* \* \* \* \*